United States Patent Office 3,063,960
Patented Nov. 13, 1962

3,063,960
ALKYLENE OXIDE POLYMERS STABILIZED WITH AMINO-FORMALDEHYDE CONDENSATION PRODUCTS
Keith L. Smith, Charleston, W. Va., assignor to Union Carbide Corporation, a corporation of New York
No Drawing. Filed Oct. 3, 1958, Ser. No. 765,041
6 Claims. (Cl. 260—45.2)

This invention relates to alkylene oxide polymers. In one aspect this invention relates to the stabilization of alkylene oxide polymers against appreciable molecular degradation during storage and/or transit or the like.

The preparation of alkylene oxide polymers such as poly(ethylene oxide), poly(propylene oxide), poly(butylene oxide) and the like which have a reduced viscosity in the range from about 1.0 to about 60, and higher, is the subject matter of the application entitled "Polymerization of Epoxides," by F. N. Hill, and F. E. Bailey, Jr., Serial No. 587,933, filed May 29, 1956, now abandoned, and assigned to the same assignee as the instant application. The reduced viscosities of poly(ethylene oxide) referred to in the above-said application are measured in acetonitrile at a concentration of 0.2 gram of polymer per 100 milliliters of solvent at 30° C.; the reduced viscosities of the other alkylene oxide polymers are more conveniently measured in benzene. The above-mentioned application teaches the preparation of poly(alkylene oxide) by polymerizing alkylene oxide in contact with certain metal carbonate catalysts, such as, for example, calcium carbonate, barium carbonate, strontium carbonate and others. These metal carbonate catalysts are advantageously employed in concentrations in the range from about 0.3 to 3 parts by weight per 100 parts by weight of alkylene oxide. The polymerization reaction can be conducted in the liquid phase at a temperature in the range from about 70° to about 150° C. It is preferred that the metal carbonate catalyst contain not more than one part by weight of non-sorbed water per 100 parts by weight of monomer, and at least 0.01 part by weight of sorbed water per 100 parts by weight of catalyst. It is further preferred that the carbonate catalyst be free from ions which reduced their catalytic activity such as, for example, chlorate and thiosulfate ions.

For further information regarding the production of poly(alkylene oxide) reference is hereby made to the disdisclosure of the above-identified application Serial No. 587,933.

The preparation of granular poly(ethylene oxide) having a reduced viscosity in acetonitrile in the range from about 1.0 to about 60, and higher, is the subject matter of the application entitled "Polymerization of Epoxides and New Products Obtained Thereby," by F. N. Hill, J. T. Fitzpatrick, and F. E. Bailey, Jr., Serial No. 587,955, filed May 29, 1956, now abandoned, and assigned to the same assignee as the instant application. This application teaches the preparation of poly(ethylene oxide) by polymerizing ethylene oxide in contact with about 0.2 to about 10 parts by weight, per 100 parts by weight of monomer, of a catalyst such as the alkaline earth metal amides, hexammoniates, or mixtures thereof. The polymerization reaction is preferably conducted at a temperature in the range from about 0° to 70° C. in the presence of a liquid organic medium such as the normally liquid straight and branch chain saturated hydrocarbons, cyclic and alkyl-substituted cyclic saturated hydrocarbons, and the like, e.g., heptane, methylcyclopentane, etc., in which the ethylene oxide reagent is soluble and the resulting polymer is insoluble. Agitation of the reaction mixture during the polymerization results in the production of granular ethylene oxide polymer having a reduced viscosity in acetonitrile above about 1.0, and generally above about 30 and up to 60, and higher. The granular poly(ethylene oxide) can be recovered from the reaction mixture by decanting the organic medium and vacuum drying the ethylene oxide polymer. The poly(ethylene oxide) is obtained in a granular state, i.e., a finely divided solid particle form resembling in particle size finely divided sand. For further information regarding the production of granular poly(ethylene oxide) reference is hereby made to the disclosure of application Serial No. 587,955.

Lower olefin oxides such as ethylene oxide, propylene oxide, butylene oxide, and the like, can also be polymerized, in the presence of certain divalent metal amide-alcoholate catalysts, to solid polymers having a reduced viscosity of at least 1.0. This polymerization process is the subject matter of application Serial No. 674,308, entitled "Epoxide Polymerization and Compounds Therefor," by F. E. Bailey, Jr., et al., filed July 26, 1957, now abandoned, and assigned to the same assignee as the instant application. The particular class of catalysts employed in the polymerization process of the above-said application is the metal amide-alcoholates wherein the metal radical is a divalent metal with an atomic number greater than 4 and less than 57 from Group II of the Periodic Table. One method of preparing these catalysts is by the reaction of, for example, calcium hexammoniate with ethylene oxide in liquid ammonia to give calcium amide-ethylate. The polymerization reaction is a liquid phase reaction and can be effected at temperatures as low as $-30°$ C. and as high as $+150°$ C. In a preferred embodiment ethylene oxides can be polymerized in the presence of an inert liquid organic medium in which the monomer is soluble and the resulting polymer is insoluble. Agitation of the reaction mixture and controlling the temperature between about $-30°$ C. to about $+70°$ C. results in the production of poly(ethylene oxide) in granular form. For further information regarding this polymerization route reference is hereby made to the disclosure of the above-identified application Serial No. 674,308.

In addition, ethylene oxide polymers which have been molecularly degraded to a reduced viscosity above about 1.0 by the reaction or treatment with a halogenating agent such as an alkali metal hypochlorite or alkaline earth metal hypochlorite can be employed in the instant invention. The molecular degradation of poly(ethylene oxide) via treatment with a halogen or halogen-liberating compound is the subject matter of application Serial No. 668,306 entitled "Halogen Modified Poly(Alkylene Oxide) Resins," by K. L. Smith et al., filed June 27, 1957, and assigned to the same assignee as the instant application. Ethylene oxide polymers having a reduced viscosity above about 1.0 can be subjected to reduced viscosity loss, i.e., decrease in molecular weight, via treatment with a peroxide compound, notably peracetic acid. The peroxide compound degradation treatment is the subject matter of application Serial No. 668,547 entitled "Alkylene Oxide Polymers," by K. L. Smith and E. C. Seltzer, now U.S. 2,982,742, filed June 27, 1957, and assigned to the same assignee as the instant application. For further information, incorporation by reference to the disclosures of application Serial Numbers 668,306 and 668,547 is hereby made.

The understanding and practice of the instant invention will be greatly facilitated by defining various terms which will be referred to hereinafter.

By the term "reduced viscosity," as used herein, is meant a value obtained by dividing the specific viscosity by the concentration of the polymer in the solution, the concentration being measured in grams of polymer per 100 milliliters of solvent at a given temperature, and is regarded as a measure of molecular weight. The specific viscosity is obtained by dividing the difference between the viscosity of the solution and the viscosity of the solvent by the viscosity of the solvent. Unless otherwise stated, the reduced viscosities herein referred to are measured at a concentration of 0.2 gram of polymer in 100 milliliters of acetonitrile at 30° C. Also, unless otherwise stated herein, the reduced viscosity of alkylene oxide polymers, particularly poly(ethylene oxide), is a value of at least 1.0 and upwards to 75, and higher.

The term "aqueous bulk viscosity," as used herein, refers to the viscosity of the stated concentration of polymer in water, as measured at two revolutions per minute on a Model RVF Brookfield Viscometer at ambient room temperatures, i.e., about 24° to 27° C.

The term "apparent viscosity,"[1] as used herein, refers to the calculation by the use of Hagen-Poiseuille expression for the determination of absolute viscosity based upon the assumption of Newtonian materials. The word "apparent" is applied because viscosity is calculated under the assumption of a material exhibiting Newtonian flow although a non-Newtonian flow may in fact actually exist. In a Newtonian material shear rate varies linearly with shear stress during flow. In a non-Newtonian material shear rate does not vary linearly with shear stress during flow. The term "shear rate" can be defined as the first derivative of velocity with respect to the distance normal to the direction of velocity, and is expressed in reciprocal seconds. The apparent viscosity of alkylene oxide polymers in the range from about 200 to about 120,000 poises (at 150° C., 10 to 2,000 p.s.i.g.) approximately corresponds to the reduced viscosity, for example, of ethylene oxide polymers having a value in the range from about 1.0 to about 60. The apparent viscosity of the alkylene oxide polymers referred to in this specification, unless otherwise stated, is in the range from about 200 to about 120,000 poises at the above-stated conditions of temperature and pressure.

The term "bulk polymerization process," as used herein, refers to polymerization in the absence of an organic medium or diluent. The term "solution polymerization process," as employed herein, refers to polymerization in the presence of an organic medium or diluent which is soluble for both the monomer employed and polymer produced. The term "suspension polymerization process," as used herein, refers to polymerization in the presence of an organic medium in which the monomer employed is soluble and the polymer produced is insoluble. A granular polymer, such as granular poly(ethylene oxide), results from the suspension polymerization of an agitated reaction mixture comprising ethylene oxide in contact with a polymerization catalyst therefor, e.g., calcium amide, calcium amide-ethylate, etc., in the presence of an organic medium, e.g., heptane, in which ethylene oxide is soluble and the resulting poly(ethylene oxide) is insoluble. The granular poly(ethylene oxide) thus produced is obtained in a finely divided solid particle state and resembles finely divided sand in particle size. Unlike the granular poly(ethylene oxide) resulting from the suspension polymerization process, the bulk and solution polymerization processes yield a polymer which is substantially a homogeneous mass either conforming to the shape of the reaction vessel, or after driving off the organic medium, for example, by means of treating in a Marshall Mill (under vacuum and at slightly elevated temperatures), resembles layers or sheets. This polymer subsequently can be reduced in particle size, for example, by dicing or the like.

The term "granular," as used herein, refers to the particle size of the alkylene oxide polymers, for example, poly(ethylene oxide) prepared by suspension polymerization. A granular polymer product is one which is in a free-flowing state and comprises particles averaging less than 5 mesh in size (U.S. standard size sieve).

Poly(ethylene oxide) which has a reduced viscosity in acetonitrile of at least 1.0 and upwards to 75, and higher, is subjected to substantial loss in reduced viscosity, i.e., molecular weight degradation, when stored at room temperature for several days, when heated for shorter periods of time at elevated temperature, and when stored in the form of water or organic solutions. It has been observed that such reduced viscosity loss or molecular weight degradation of the polymer increases with the molecular weight or reduced viscosity of the polymer. In many applications the usefulness of ethylene oxide polymers is greatly enhanced by preparing and maintaining a relatively high molecular weight therein, e.g., polymers having a reduced viscosity above about 1.0. For instance, a customer who orders poly(alkylene oxide) of a definite viscosity range for a particular field of application desires a product, i.e., poly(alkylene oxide), of relative stability or enhanced stability especially during storage or in transit. However, unless poly(ethylene oxide) is adequately protected against substantial molecular weight degradation, the loss in molecular weight can be so serious as to completely change the physical character of the polymer from a tough strong resin to a brittle wax, and as a consequence, the resulting degraded polymer has limited applicability in various fields of uses.

The present invention contemplates the stabilization of resinous poly(alkylene oxide) by incorporating therein a stabilizing amount of thermosetting condensation product selected from the group of urea-formaldehyde, melamine-formaldehyde, and melamine-urea-formaldehyde. By the practice of the instant invention the above-said poly(alkylene oxide) exhibits improved stability against molecular degradation during storage, transit, or in aqueous or organic solution over a period of several weeks as compared with the corresponding poly(alkylene oxide) lacking the above-mentioned stabilizers.

Accordingly, one or more of the following objects will be achieved by the practice of the instant invention.

It is an object of this invention to improve the stability of poly(alkylene oxide) having an apparent viscosity of from about 200 to about 120,000 poises against apparent viscosity loss. It is another object of this invention to provide a composition comprising resinous poly(ethylene oxide), and a stabilizing amount of a stabilizer hereinafter described. A further object of this invention is to render granular poly(ethylene oxide) which has a reduced viscosity of at least about 1.0 (prepared by the suspension polymerization using a catalyst such as an alkaline earth metal amide, hexammoniate, or mixture thereof, or an alkaline earth metal amide-alcoholate) relatively stable against molecular weight degradation by incorporating thereto a stabilizing amount of a stabilizer hereinafter described. These and other objects will become apparent to those skilled in the art from a consideration of the instant disclosure.

In accordance with the present invention it has been found that the molecular weight stability of resinous poly(alkylene oxide), preferably granular poly(ethylene oxide) which has a reduced viscosity of at least about 1.0, can be considerably enhanced or improved during storage, in transit, in aqueous or organic solutions, etc., by incorporating thereto a stabilizing amount of a thermosetting condensation product selected from the group of urea-formaldehyde, melamine-formaldehyde, or melamine-urea-formaldehyde. For brevity, the term "stabilizer" is often employed throughout this specification to include the above-mentioned urea-formaldehyde, melamine-formaldehyde, and melamine-urea-formaldehyde thermosetting condensation products. It should also be noted that the act of "stabilizing" the resinous alkylene oxide polymer is not to be confused with the process of "inhibiting" or "retarding" the polymerization of polymerizable monomers, or with the process or act of "short-stopping" polymers from further polymerization.

The preparation of the thermosetting intermediate condensation products, i.e., melamine-formaldehyde, urea-

---

[1] For further information, note article by K. L. Smith et al., pages 12-16, Indust. and Engr. Chem., January 1958.

formaldehyde, and melamine-urea-formaldehyde products, is well-known to the art. For example, two moles of urea and three moles of formaldehyde (40 percent solution) can be condensed in aqueous solution in the presence of pyridine, ammonia, or hexamethylenetetramine. The reaction is subsequently stopped at the syrupy stage, or at that point where the reaction mixture is of a gel-like consistency. The melamine-urea-formaldehyde product can be prepared by preliminary condensation of urea, formaldehyde and melamine. In general, the sum of the molal concentrations of melamine and urea will be greater than the molal concentration of formaldehyde present in the preparation of the three component product. The preliminary condensation is stopped prior to the stage where the resulting product becomes water-insoluble, i.e., the three component product is a water-soluble theromsetting intermediate condensation product.

The technique by which the stabilizers, i.e., urea-formaldehyde, melamine-formaldehyde, or melamine-urea-formaldehyde products, are incorporated or admixed with the alkylene oxide polymer is not critical, and any of a variety of means can be employed to effect intimate admixing of the polymer with the stabilizer. One desirable method involves the admixture of the stabilizer with, for example, poly(ethylene oxide) at the time the latter is formed. Another method which can be advantageously employed comprises introducing the stabilizer of choice into an organic slurry of poly(ethylene oxide), said poly(ethylene oxide) being inert and insoluble in the organic medium. It is preferred that the organic medium be an inert nonsolvent for the polymer, and that it be an inert solvent for the particular stabilizer contemplated. Removal of the organic medium such as by evaporation or other conventional means results in an intimate admixture of stabilizer and polymer. Suitable inert, organic media are which can be used are saturated aliphatic ethers, ketones, saturated aliphatic hydrocarbons, higher molecular weight saturated alcohols, saturated aliphatic esters, and the like, e.g., dibutyl ether, diethyl ether, dioxane, acetone, methyl ethyl ketone, hexane, cyclohexane, heptane, butanol, ethyl acetate, dimethylformamide, and others. Additional methods include mixing the stabilizer in finely divided form with the molten polymer; dissolving the stabilizer in polymer solutions, i.e., organic solvents in which poly(ethylene oxide) is soluble, such as acetic acid, acetonitrile, benzene, chlorobenzene, and water; and admixing finely divided stabilizer and polymer on a two-roll miller, extruder, Banbury mixer, and the like.

As stated previously the present invention contemplates the use of a stabilizing amount of the stabilizer of choice to effectively stabilize the polymer against substantial molecular weight degradation. By the term "stabilizing amount," as used herein, is meant that quantity of stabilizer which when added to the system containing poly-(alkylene oxide), and in particular granular poly(ethylene oxide), is sufficient to effectively stabilize the polymer against substantial molecular weight degradation. Expressed differently, a "stabilizing amount" of the stabilizer of choice substantially reduced the loss of reduced or aparent viscosity of the polymer being stabilized, during storage, in transit, etc., as compared with the corresponding polymer not containing therein the stabilizers of this invention. The art is well apprised of the technique of stabilizing organic compounds in general, and the amount of stabilizer employed will be governed, to an extent, by the reduced or apparent viscosity of the alkylene oxide polymer, by the particular stabilizer employed, and other considerations.

In general, a stabilizer concentration range of from about 0.1 weight percent, and lower, to about 5.0 weight percent, based on the weight of poly(ethylene oxide), is effective; from about 0.4 to about 3.0 weight percent of stabilizer, based on the weight of polymer is preferred. The ethylene oxide polymer throughout of reduced viscosities from about 1.0 and upwards to 60, and higher, are water-soluble. They appear to form homogeneous systems with water in all proportions. Although the high molecular weight polymers merely swell on the addition of small amounts of water, on the addition of greater amounts of water, the polymers pass into solution. The water solutions are viscous, the viscosity increasing both with the concentration of the polymer in the solution and the reduced viscosity of the polymer. These polymers of ethylene oxide show little change in melting point with increased reduced viscosity (an indication of increased molecular weight) and the melting point, as measured by change in stiffness with temperature, was found to be about $66° \pm 2°$ C. throughout the range of reduced viscosities of from about 1.0 to 10, and greater. These polymers, upon X-ray examination show the sort of crystallinity exhibited by solid polyethylene. The crystallization temperature, as determined from measuring the break in the cooling curve, is about $55°$ C. The polymers of ethylene oxide possessing a reduced viscosity of at least 1.0 are hard, tough, horny, water-soluble materials useful in the sizing of synthetic and natural warp yarn and, also, as coagulants or flocculants for solids comprising silica and/or clay material dispersed in aqueous media. The lower alkylene oxide polymers are also useful for the production of various shaped articles.

The following examples are illustrative.

EXAMPLE 1

The granular ethylene oxide polymer employed in this example was prepared via the suspension polymerization route using ethylene oxide modified alkaline earth metal amide catalyst. The polymer had a reduced viscosity (in acetonitrile) of 37.0; the aqueous bulk viscosity (1.0 weight percent polymer in aqueous solution) was 4,000 centipoises as measured at 2 r.p.m. on the Model RVF Brookfield Viscometer. To the above-said polymer there was added 1.02 weight percent chlorine, followed by agitation for approximately 30 minutes, and subsequently, by neutralization of the polymer admixture (in accordance with the procedure set forth in application Serial No. 668,306 supra). The aqueous bulk viscosity of a 5.0 weight percent aqueous solution of the degraded polymer resulting from the chlorine treatment, supra, was determined to be 6,120 centipoises as measured at 2 r.p.m. on the above-described viscometer.

The chlorine-degraded polymer (250 parts by weight) was subsequently dissolved in distilled water (4,750 parts by weight). The resulting solution was then divided into several portions. To one portion there was added 2.0 weight percent "Accobound 3990," [1], based on the weight of polymer in solution; another portion serves as the control for this experiment. Both portions were then mixed on a set of can rolls. Initial aqueous bulk viscosities of both solution were obtained with the Model RVF Brookfield Viscometer using the No. 1 spindle operating at 2 r.p.m. aqueous bulk viscosities of these solutions were again determined in similar manner after ageing for one week and two weeks, respectively. The pertinent data and results are shown in Table I below.

Table I

| Stabilizer | Initial viscosity [1] | Storage, 1 week 25° C. | | Storage, 2 weeks, 25° C. | |
|---|---|---|---|---|---|
| | | Viscosity [1] | Percent loss | Viscosity [1] | Percent loss |
| Control | 3,070 | 2,420 | 21.2 | 2,360 | 23.1 |
| "Accobound 3990" [2] | | 2,550 | 16.9 | 2,430 | 20.9 |

[1] Aqueous bulk viscosity measured in centipoises.
[2] An aqueous, cationic melamine-formaldehyde resin syrup that is soluble in all proportions in water.

[1] An aqueous, cationic melamine-formaldehyde resin syrup that is soluble in all proportions in water.

EXAMPLE 2

Granular poly(ethylene oxide) prepared via the suspension polymerization route using ethylene oxide modified calcium amide catalyst was employed in this example. The polymer possessed a reduced viscosity (in acetonitrile) of 63.5; the aqueous bulk viscosity of 1.0 weight percent polymer in aqueous solution was 8,150 centipoises as determined by the viscometer described in Example 1.

Fifty-five grams of the above-described polymer were dissolved in 5,445 grams of distilled water, and the resulting solution was then divided into several portions. To one portion there was added 5.0 weight percent "Accobound 3990," based on the weight of polymer in solution; another portion served as the control for this experiment. Both portions were then subjected to agitation, overnight, on a set of can rolls. Initial aqueous bulk viscosities of the two samples were determined, and these viscosity determinations were again repeated after ageing for one week, two weeks, and one month, respectively, as measured by the viscometer described in Example 1 supra. The pertinent data and results are shown in Table II below.

Table II

| Stabilizer | Initial Viscosity [1] | Storage, 1 week, 25° C. | | Storage, 2 weeks, 25° C. | | Storage, 1 mo., 25° C. | |
|---|---|---|---|---|---|---|---|
| | | Viscosity [1] | Percent loss | Viscosity [1] | Percent loss | Viscosity [1] | Percent loss |
| Control | 9,680 | 7,960 | 17.8 | 6,140 | 36.6 | 4,880 | 49.6 |
| "Accobound 3990" [2] | | 9,600 | 0.8 | 8,060 | 16.7 | 6,920 | 28.5 |

[1] Aqueous bulk viscosity measured in centipoises.
[2] See footnote 2, Table I, supra.

EXAMPLE 3

Granular poly(ethylene oxide) prepared via the suspension polymerization route using ethylene oxide modified calcium amide catalyst was employed in this example. The resulting polymer had a reduced viscosity (in acetonitrile) of 39.1; the aqueous bulk viscosity of 1.0 weight percent polymer in aqueous solution was 3,175 centipoises as determined by the viscometer described in Example 1.

Forty grams of the above-described polymer were dissolved in 4,000 grams of distilled water, and the resulting solution was then divided into several portions. To one portion there was added 2.0 weight percent "Accobound 3990," based on the polymer weight in solution; another portion served as the control. Initial aqueous bulk viscosities of the two samples were determined, and these viscosity determinations were repeated after ageing for one week. To avoid contamination; a given sample (containing the stabilizer) was employed for but one ageing period. The experiments were repeated for ageing periods of two weeks, one month, and two months.

The pertinent data and results are set forth in Table III below.

EXAMPLE 4

Granular poly(ethylene oxide) prepared by the suspension polymerization route using ethylene oxide modified calcium amide catalyst was employed in this example. The polymer possessed a reduced viscosity of 39.1, an intrinsic viscosity of 19.3, and an aqueous bulk viscosity of 1.0 weight percent polymer in aqueous solution of 3,175 centipoises. The polymer was found to contain 0.5 weight percent ash calculated as calcium oxide and had an apparent density of 28 pounds per foot. Forty grams of the above-described polymer were dissolved in 4,000 ml. of distilled water, and the resulting solution was then divided into two portions. To one portion there was added 2.0 weight percent of "Accobound 3990"; the other portion served as the control. Each solution was aged for five months, with viscosities taken at intervening periods of time according to the manner previously described. Results are shown in Table IV below.

Table IV

| Time | Control | | 2% melamine-formaldehyde | |
|---|---|---|---|---|
| | Viscosity [1] | Percent loss | Viscosity [1] | Percent loss |
| Initial | 3,510 | | 3,680 | 0.0 |
| 1 week | 3,147 | 8.9 | 3,370 | 4.0 |
| 2 weeks | 3,030 | 13.7 | 2,800 | 20.2 |
| 1 month | 2,480 | 29.4 | 2,610 | 25.6 |
| 2 months | 2,225 | 36.5 | 2,240 | 36.2 |
| 5 months | 1,315 | 62.5 | | |

[1] Determined at room temperature, i.e., approximately 24° C.

EXAMPLE 5

The polymer used in this experiment was chlorine modified poly(ethylene oxide) suspension-polymerized polymer similar to that described in Example 1. The original polymer was polymerized by suspension methods using calcium amide catalyst which resulted in a polymer having an intrinsic viscosity of 17.9, a one weight percent aqueous bulk solution viscosity of 4,000 centipoises, and an ash content calculated as calcium oxide of 0.67 weight percent. This polymer was treated in dry form for 30 minutes with 1.332 weight percent chlorine based on the weight of the polymer. After such treatment the 5.0 weight percent aqueous bulk solution viscosity of the material was found to be 875 centipoises.

A 10 weight percent solution of this polymer in water was prepared and divided into two portions. To one portion there was added two weight per cent based on the weight of poly(ethylene oxide), of a urea-formaldehyde polymer ("Parex 620"[1]). The viscosity was measured initially in the manner previously described, and again after two days, the second week and the first month of

[1] A dry, powdered urea-formaldehyde resin having good storage stability. Used to impart wet-strength to paper either as a beater or tub size additive.

Table III

| Stabilizer | Initial viscosity [1] | Storage, 1 wk., 25° C. | | Storage, 2 wks., 25° C. | | Storage, 1 mo., 25° C. | | Storage, 2 mos., 25° C. | |
|---|---|---|---|---|---|---|---|---|---|
| | | Viscosity [1] | Percent loss [2] | Viscosity [1] | Percent loss [2] | Viscosity [1] | Percent loss [2] | Viscosity [1] | Percent loss [2] |
| Control | 3,400 | 3,305 | 5.8 | 3,030 | 13.7 | 2,490 | 29.1 | 2,120 | 39.6 |
| Check control | 3,620 | 3,090 | 12.0 | 3,030 | 13.7 | 2,470 | 29.6 | 2,330 | 33.6 |
| "Accobound 3990" [3] | 3,820 | 3,680 | | 3,370 | 4.0 | 2,800 | 20.2 | 2,610 | 25.6 |

[1] Aqueous bulk viscosity measured in centipoises.
[2] Percent loss is based on the average of the initial values of the two control solutions.
[3] See footnote 2, Table I, supra.

the room temperature ageing period. Results are shown in Table V below.

Table V

| Time | Control | | 2% urea-formaldehyde | |
|---|---|---|---|---|
| | Viscosity | Percent loss | Viscosity | Percent loss |
| Initial | 875 | | | |
| 2 days | 770 | 12 | 800 | 8.6 |
| 2 weeks | 680 | 22.3 | 735 | 16.0 |
| 1 month | 655 | 25.2 | 705 | 19.4 |

EXAMPLE 6

To 16,000 milliliters of distilled water there was added 160 gram of granular poly(ethylene oxide). A 5-inch diameter flat blade turbine agitator operating at 100 r.p.m. was employed to effect complete solution of the aqueous admixture. Subsequently, the resulting aqueous solution was divided into several 400 gram samples, and to one of these samples there was added "Beetle" Resin 230–8.[1] Initial viscosity was obtained as the average of three replicate controls using the Brookfield Viscometer operating at 2 r.p.m. These initial controls were discarded and an additional six controls were aged along with the sample containing the stabilizer dissolved therein (this step was taken to avoid any possible contamination of the samples). The samples then were stored in the dark at a temperature of about 22°–23° C. At the end of the six month's ageing period the aqueous bulk viscosity of the controls and the sample containing the stabilizer therein was determined with the same Brookfield Viscometer; the resulting viscosities were corrected to a common control temperature using a correction value of 97 centipoises per degree. The above procedure was duplicated using granular poly(ethylene oxide) prepared via a different catalytic route. The pertinent data and results are shown in Table VI below.

[1] Butylated melamine-urea-formaldehyde condensation product in butanol-xylenol; solution contained 50 percent solids, 27 percent butanol, 23 percent xylenol.

Table VI

| Stabilizer | Aqueous bulk viscosity (cps.) loss | |
|---|---|---|
| | 0.5 weight percent stabilizer [1] | 2.0 weight percent stabilizer [2] |
| Control (no stabilizer; average of 6 samples) | 45.1 | 39.9 |
| "Beetle" resin 230–8 | 21.6 | 16.1 |

[1] "Beetle" resin 230–8 was added aqueous solution containing dissolved therein granular poly(ethylene oxide) prepared by the suspension polymerization route using calcium amide catalyst.
[2] "Beetle" resin 230–8 was added aqueous solution containing dissolved therein granular poly(ethylene oxide) prepared by the suspension polymerization route using oxide modified calcium amide catalyst.

Reasonable variations and modifications of this invention can be made or carried out in the light of the above disclosure without departing from the spirit and scope thereof.

What is claimed is:

1. A composition comprising resinous poly(alkylene oxide) and a stabilizing amount of a thermosetting intermediate condensation product selected from the group consisting of urea-formaldehyde, melamine-formaldehyde, and melamine-urea-formaldehyde.

2. A composition comprising resinous poly(ethylene oxide) and a stabilizing amount of a thermosetting intermediate condensation product selected from the group consisting of urea-formaldehyde, melamine-formaldehyde, and melamine-urea-formaldehyde.

3. The composition of claim 2 wherein said poly(ethylen oxide) is granular poly(ethylene oxide) prepared by the suspension polymerization of ethylene oxide in the presence of a catalyst selected from the group consisting of alkaline earth metal amides, alkaline earth metal hexammoniates, and alkaline earth metal amide-alcoholates.

4. The composition of claim 3 wherein said condensation product is urea-formaldehyde.

5. The composition of claim 3 wherein said condensation product is melamine-formaldehyde.

6. The composition of claim 3 wherein said condensation product is melamine-urea-formaldehyde.

References Cited in the file of this patent

UNITED STATES PATENTS

| | | |
|---|---|---|
| 2,458,796 | Ott et al. | Jan. 11, 1949 |
| 2,528,360 | Greenlee | Oct. 31, 1950 |
| 2,561,183 | Crozier et al. | July 17, 1951 |
| 2,631,138 | Dannenberg | Mar. 10, 1953 |
| 2,897,178 | Hill | July 28, 1959 |
| 2,921,047 | Smith | Jan. 12, 1960 |
| 2,982,752 | Phillips et al. | May 2, 1961 |